United States Patent [19]

Ohara et al.

[11] 4,285,012

[45] Aug. 18, 1981

[54] LIGHT BEAM SCANNER

[75] Inventors: Yuji Ohara; Masahiro Ohnishi, both of Asaki, Japan

[73] Assignee: Fuji Photo Film Co., Ltd., Minami-ashigara, Japan

[21] Appl. No.: 67,488

[22] Filed: Aug. 16, 1979

[30] Foreign Application Priority Data

Aug. 16, 1978 [JP] Japan .................................. 53-99886

[51] Int. Cl.³ .............................................. H04N 1/12
[52] U.S. Cl. ..................................... 358/293; 346/108
[58] Field of Search ................. 358/264, 285, 292, 293, 358/294; 346/108, 75

[56] References Cited

U.S. PATENT DOCUMENTS

| | | | |
|---|---|---|---|
| 2,941,033 | 6/1960 | Fromm et al. | 358/293 |
| 3,609,225 | 9/1971 | Stallard | 358/285 |
| 3,657,471 | 4/1972 | Sasabe et al. | 358/75 |
| 3,943,529 | 3/1976 | Feldman et al. | 346/108 |
| 4,081,842 | 3/1978 | Harbaugh et al. | 358/264 |

Primary Examiner—Joseph A. Orsino, Jr.
Attorney, Agent, or Firm—Sughrue, Rothwell, Mion, Zinn and Macpeak

[57] ABSTRACT

A light beam scanner having an optical deflector which can repeatedly scan one surface to be scanned in a predetermined direction with a light beam and can start each scan at a desired time instant. A drive mechanism moves the surface to be scanned, in a direction substantially perpendicular to the direction of scanning lines formed on said surface. A signal is outputted whenever the surface to be scanned is moved a predetermined distance and a mechanism is employed for operating the optical deflector in synchronization with the output signal.

13 Claims, 9 Drawing Figures

F I G. 4
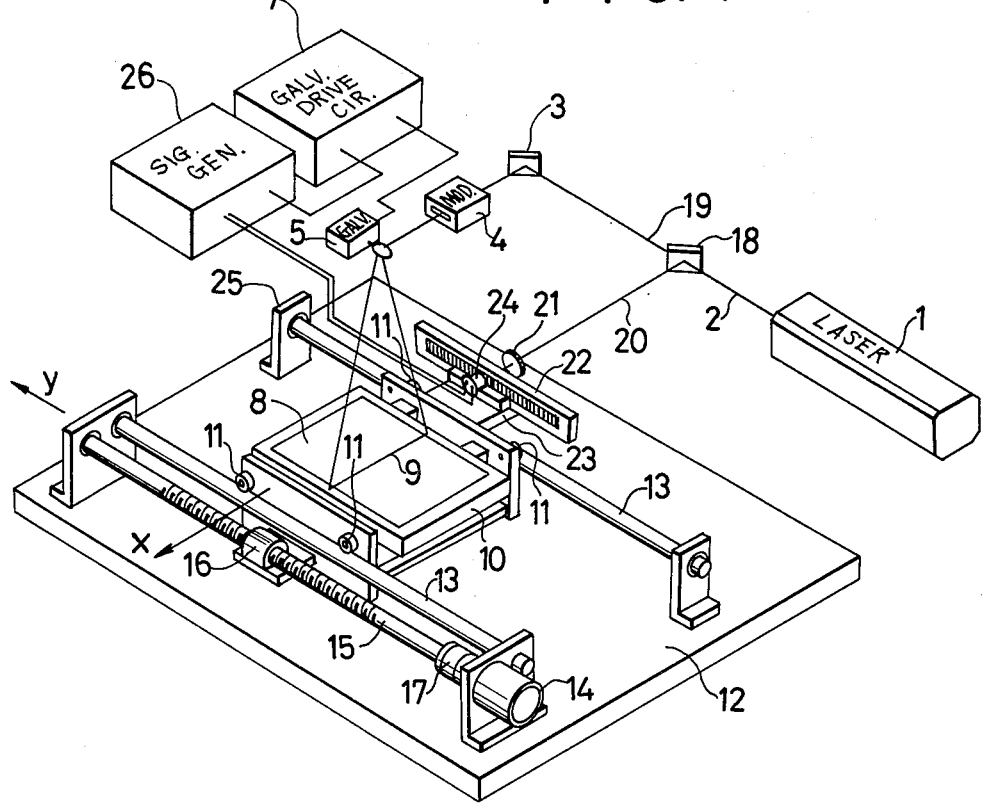
F I G. 5
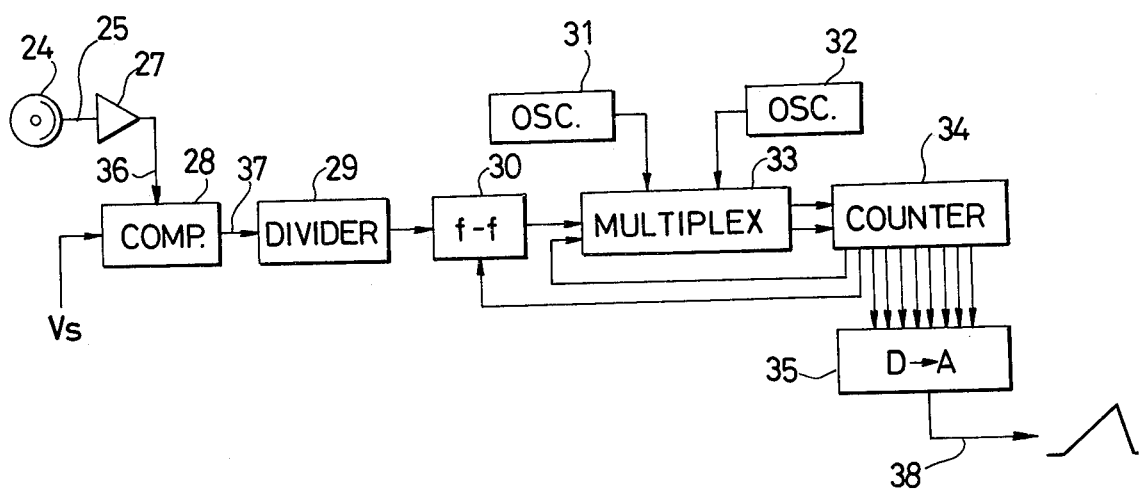

LIGHT BEAM SCANNER

BACKGROUND OF THE INVENTION

This invention relates to light beam scanners in which a light beam is one-dimensionally deflected to form a scanning line on a surface to be scanned and the surface is moved substantially perpendicular to the direction of the scanning line. This X-Y scanning forms a plurality of parallel scanning lines on the surface. More particularly, this invention relates to a light beam scanner in which the parallel scanning lines are formed at predetermined equal intervals.

A device for two-dimensionally scanning a surface to be scanned, with a light beam is known in the art. In this system the light beam is deflected in one direction by an optical deflector (hereinafter referred to as "a main scan" when applicable), and the surface to be scanned is moved substantially perpendicular to the direction of the scanning line formed on the surface (hereinafter referred to as "an auxiliary scan" when applicable). In the auxiliary scanning mechanism of the conventional light beam scanner, a continuously rotating motor is employed as the drive source and the rotation of the motor is converted into the linear motion of the surface to be scanned. In order to convert the rotational motion into linear motion, a lead screw is used, or the surface to be scanned is pulled (by using a belt or a wire).

If, in such a light beam scanner, the main scan is carried out with a constant period, but the speed of the auxiliary scan, i.e., the movement speed of the surface to be scanned is not strictly constant (hereinafter this being referred to as "irregular feeding" when applicable), then the scanning lines are arranged at irregular intervals. That is, the scanning lines are arranged coarsely and finely. If, in such a case, information inputted from outside is recorded as an image with a light beam, then the recorded image is such that coarse and fine intervals of the scanning lines can be observed as changes in density. Hence, the irregular intervals of the scanning lines appear as a stripe pattern. Therefore, the quality of the image is considerably lowered. This is especially true when the interval of the scanning lines is so short that the scanning lines are overlapped. Then the region in the image where the scanning lines are overlapped is higher in density than the region in the image where the scanning lines are coarsely arranged. As a result, the stripe pattern is emphasized. This is serious especially in an image which is recorded with continuous tone.

This problem is described in detail in "Various Problems in Cylindrical Facsimile Auxiliary Scan" of the National Technical Report, Vol. 22, No. 5 (Oct. 1976) pp. 550 to 558, or in "Visibility and Correction of Periodic Interference Structures in Line-by-Line Recorded Images" of the Journal of Applied Photographic Engineering, Vol. 2, No. 2 (Apr. 1976) pp. 86 to 92. It has also been confirmed by experiments done by the inventors.

In order to eliminate the deterioration of the image recorded by the scanning lines, which is caused by the occurrence of the stripe pattern, a variety of methods have been proposed. In one of the conventional methods, the auxiliary scan mechanism is operated with high accuracy to minimize the irregular feeding. In another conventional method, an optical deflector is additionally used to deflect the light beam in the auxiliary scan direction. The position of the light beam is corrected so that the scanning lines are arranged at equal intervals.

Concerning the former method, a lead screw system is known as best in accuracy. However, this system must satisfy the requirements that the fluctuation in rotation of a motor which is a drive source must be minimized. Each essential component such as a lead screw or a lead nut must be manufactured with high accuracy and the combinations of the essential components such as the junction of the motor and the lead screw and the engagement of the lead screw and the lead nut must be achieved with high accuracy. Thus, the light beam scanner according to the former method is necessarily expensive. Because the accuracy in combination of the lead nut and screw is increased, the load torque exerted on the motor is increased. Furthermore, if the installation accuracy is not sufficiently high, then the load torque is significantly changed. That is, the functional burden to the motor is increased.

The latter method is effective for the case where an optical deflector (such as a rotary multi-surface mirror) is used to effect the main scan with a constant period. However, this method is also disadvantageous in that since the optical deflector is additionally employed, the manufacturing cost is increased. Also, the arrangement of the entire system is rather intricate.

SUMMARY OF THE INVENTION

Accordingly, an object of this invention is to provide a light beam scanner in which the interval of scanning lines is constant.

It is another object of this invention to provide a light beam scanner where the irregular feeding of the auxiliary scan is detected to determine the start time of the main scan, and no stripe pattern due to the irregular interval of scanning lines occurs in a recorded image.

Another object of the invention is to provide a recording or reading device in which the interval of scanning lines is constant.

The foregoing objects and other objects of the invention are achieved by a light beam scanner which comprises an optical deflector which can repeatedly scan one surface to be scanned, in a predetermined direction with a light beam and can start each scan at a desired time instant. Means are provided for moving the surface to be scanned in a direction substantially perpendicular to the direction of scanning lines formed on the surface. A signal is generated whenever the surface to be scanned is moved a predetermined distance and a mechanism operates the optical deflector in synchronization with the signal.

The present invention will now be described in generalized form.

First, the elements in the light beam scanner according to the invention will be described. A first element is an optical deflector. The optical deflector is capable of: (1) projecting an incident light beam on to a surface to be scanned, (2) deflecting the light beam in a predetermined direction, (3) repeatedly carrying out the projection and deflection of the light beam with respect to the surface to be scanned, and (4) starting the scan at a desired time instant, or in practice when a predetermined signal is applied thereto. The optical deflector per se is known in the art. It may be for example, a non-inertial optical deflector such as an acousto-optical deflection element or an electro-optical deflection element, or a vibrating mirror such as a galvanometer.

A second element of the light beam scanner is a means which operates to move the surface to be scanned with the light beam by means of the optical deflector, substantially perpendicular to the direction of scanning lines formed on the surface. In other words, these components operate to arrange a plurality of scanning lines in parallel with one another, which are formed on the surface with the light beam being deflected, so that they are not overlapped and to provide new data from the combination of data carried by the scanning lines.

In this connection, the surface to be scanned is moved substantially perpendicular to the direction of the scanning lines on the surface, and therefore the recorded image is sharp in appearance with the adjacent sides thereof forming a right angle. The means adapted to move the surface to be scanned operates to hold the surface such as a recording material or an original and to continuously move it in a predetermined direction at a predetermined speed. Its drive source for the movement is, in general, an electric motor.

The means for outputting a signal whenever the surface to be scanned is moved a predetermined distance, operates to photoelectrically detect the movement of a linear encoder which moves together with the surface to be scanned and to provide the signal whenever the surface to be scanned moves the predetermined distance. The signal may be outputted not only by an optical detecting means but also by a magnetic detecting means such as a magnetic scale magnetized at predetermined intervals. It is most preferable to directly detect the one-dimensional movement of the surface to be scanned. However, it is obvious that the signal may be obtained by detecting linear or rotational movement corresponding the amount of movement of the surface.

The circuit for operating the optical deflector in synchronization with the above-described signal may be one which operates the optical deflector every time one signal is produced, or may be one which operates the optical deflector when the position signal is provided integer times (m times). Alternatively, the circuit may be such that the optical deflector is operated every 1/n signal (n being an integer). Furthermore, the circuit may be designed so that the optical deflector is operated n/m times for every signal by combining the aforementioned techniques.

This invention provides the light beam scanner in which the above-described elements are ingeniously combined to obtain its aimed effects.

The light beam scanner according to the invention will be described concretely with reference to the accompanying drawings.

BRIEF DESCRIPTION OF THE DRAWINGS

FIG. 4 is an explanatory diagram showing one example of a light beam scanner according to this invention; and FIGS. 5 through 9 are diagrams for a description of a signal processing circuit employed in the invention.

DESCRIPTION OF THE PREFERRED EMBODIMENT

Figure 1:
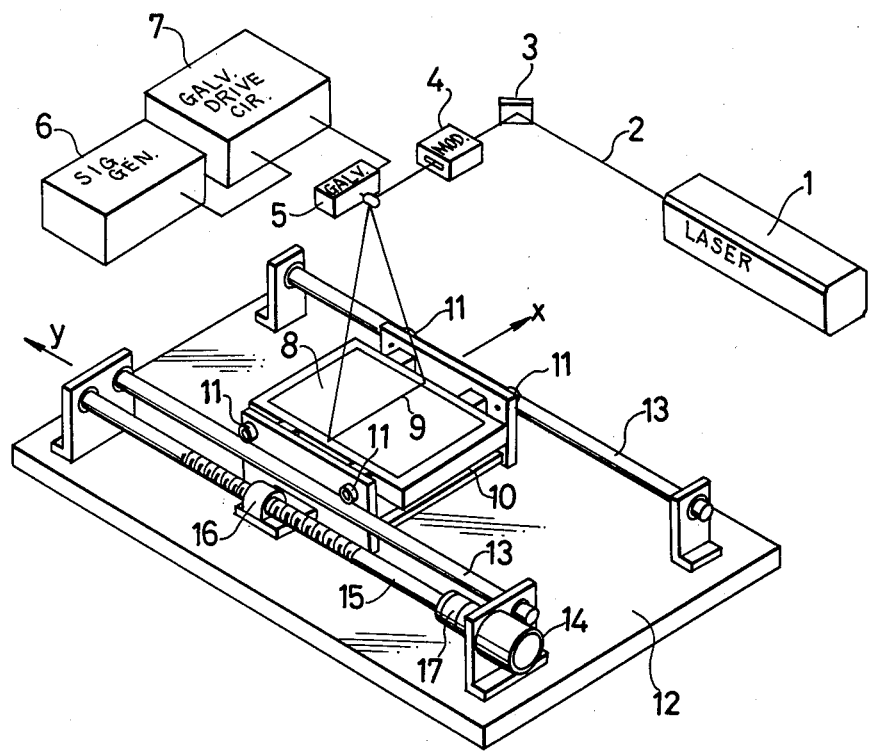
FIG. 1 is an explanatory diagram showing a conventional laser recording device.

As conductive to a full understanding of this invention, first a conventional laser scanner will be described with reference to FIG. 1.

A light beam 2 outputted by a laser generator 1 is reflected by a mirror 3 to enter an optical modulator 4. The optical modulator 4 operates to modulate the intensity of the light beam 2 in accordance with a recording signal applied thereto from an outside source. The light beam 2 thus modulated is applied to a galvanometer 5. The galvanometer 5 operates in accordance with a signal which is generated by a signal generator 6 and is then amplified by a galvanometer driving circuit 7, so that the modulated light beam is introduced onto a recording material 8 to form a scanning line 9 on the recording material.

The recording material 8 is placed on a table 10 which is moved substantially perpendicular to the scanning line 9. The table 10 is slidably supported by rollers 11 provided on the sides of the table 10 and by guide rails 13 fixedly mounted on an optical base board 12. A lead screw 15 is rotated by an electric motor 14. The lead screw 15 is engaged with a nut 16 integral with a supporting post protruding from the side of the table. Thus, the table 10 is moved in the Y-direction by rotating the lead screw 15. An electromagnetic clutch 17 is provided to couple the shaft of the motor 14 to the lead screw 15. The lead screw 15 is disengaged from the shaft of the motor 14 when the motor is started and when the direction of rotation is changed.

In the device shown in FIG. 1, the table is irregularly fed by the centering error of the shaft of the motor 14 and the lead screw 15. It is also caused by the lead screw 15 and the nut 16, the play between the lead screw 15 and the nut 16, or the manufacturing error of the feed screw 15 and the nut 16. If an image is recorded on the recording material 8 on the table 10, which is moved irregularly as described above, by using the scanning line 9 which is formed by the galvanometer 5 operated at certain time intervals, then the intervals of the scanning lines on the recorded image are irregular because of the irregular feed. As a result, stripes of variable density appear on the recorded image. That is, the recorded image exhibits very poor quality.

Figure 2:
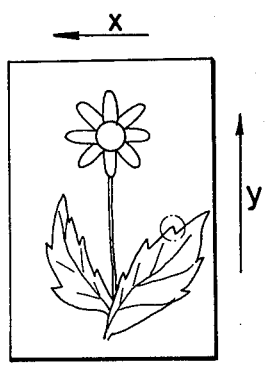
FIGS. 2 and 3 are also explanatory diagrams for a description of the reduction in quality of an image, which is caused by the irregular feeding operation of an auxiliary scan.
Figure 3:
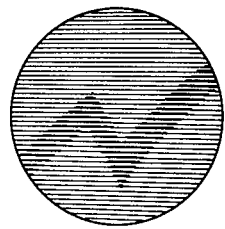

FIGS. 2 and 3 are provided for a description of the state of the stripes on the recorded image. In FIG. 2, a main scanning direction is indicated by the arrow X, and an auxiliary scanning direction is indicated by the arrow Y. FIG. 3 is an enlarged view of an encircled part of the FIG. 2 so that the scanning lines therein can be clearly observed. As seen, the part where the scanning lines are arranged coarsely, is lower in density, but the part, where the scanning lines are arranged finely, is higher in density. Thus, the overall quality of the image is considerably lowered.

One example of the laser scanner according to this invention will be described in detail with reference to FIG. 4, in which those components which have the same functions as those in FIG. 1 are similarly numbered. In FIG. 4, light from the laser generator 1 is divided into two light beams 19 and 20 by a beam splitter 18. The light beam 19 is reflected by the mirror 3 and is modulated by the optical modulator. Then, the light beam 19 is deflected by the galvanometer 5, so that a scanning line 9 is formed on the recording material 8.

On the other hand, the light beam 20 is condensed by a lens 21 fixedly supported on the optical base board 12, and is then applied to a linear encoder 22. The linear encoder 22 is fixedly secured through a support 23 to the table 10 which is moved on the optical base board 12. In the linear encoder 22, transparent parts 10 μm in width are alternately arranged on a glass substrate regularly at a pitch of 20 μm in the auxiliary scanning direction. When the light beam 20 is applied to the transparent part, it passes through the linear encoder to a light receiving unit 24 fixedly mounted on the optical base board 12. Therefore, whenever the table 10 moves 20 μm, the light receiving unit 24 outputs a signal 25 which is applied to a signal processing circuit 26. The signal processing circuit 26 drives the galvanometer 5 in synchronization with the signal 25.

One embodiment of the signal processing circuit 26 will be described with reference to FIGS. 5, 6 and 7. Referring to FIG. 5, the signal 25 from the light receiving unit 24 is amplified by an amplifier 27, and is then subjected to waveform shaping in a comparator 28. Thereafter the signal 25 thus treated is applied to a frequency divider 29. The frequency divider 29 operates to set the interval of the scanning lines 9, and can set the frequency division ratio as desired. However, because the interval of the scanning line 9 is set to M times the pitch of the linear encoder 22 (M being the integer equal to or larger than one: $M \geq 1$), to frequency division in the frequency divider 29 is applied to a flip-flop 30.

Figure 6:
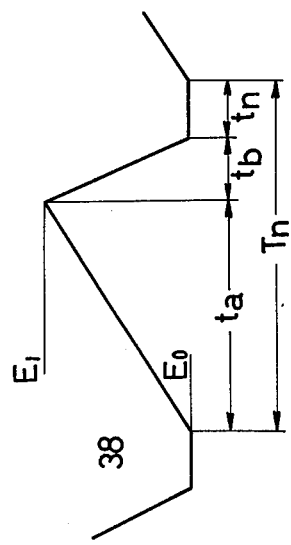

On the other hand, an output pulse train provided by an oscillator 31 is subjected to digital-to-analog conversion, thus giving a rise gradient $(E_1-E_0)/ta$ to a galvanometer drive signal 38 as shown in FIG. 6, while an output pulse train from another oscillator 32 is subjected to digital-to-analog conversion, thus giving a fall gradient $(E_1-E_0)/tb$ to the galovanometer drive signal 38. Both of the output pulse trains are applied to a multiplexer 33. In FIG. 6, time is plotted on the horizontal axis, and voltage is plotted on the vertical axis.

In FIG. 6, reference character ta designates a scanning period; tb, a fly-back period; tn, a waiting period; and Tn, the total period required for one scanning. For the scanning period ta, the galvanometer 5 is rotated in proportion to the magnitude of the galvanometer drive signal 38, to deflect the incident light beam at a predetermined speed to form a scanning line. For the fly-back period tb, the galvanometer is rotated reversely, and no scanning line is formed because the light beam is blocked by the optical modulator 4.

The multiplexer 33 operates to apply the output pulse train from the oscillator 31, as an up-count clock signal, to an up-down counter 34, and to apply the output pulse train from the oscillator 32, as a down-count clock signal, to the up-down counter 34. The applications of these two different clock signals are switched in response to the output of the flip-flop 30 and a signal indicative of the content of the up-down counter 34. The count output of the up-down counter 34 is applied to a digital-to-analog converter 35 where it is converted into the galvanometer drive signal 38 as shown in FIG. 6.

Figure 7:
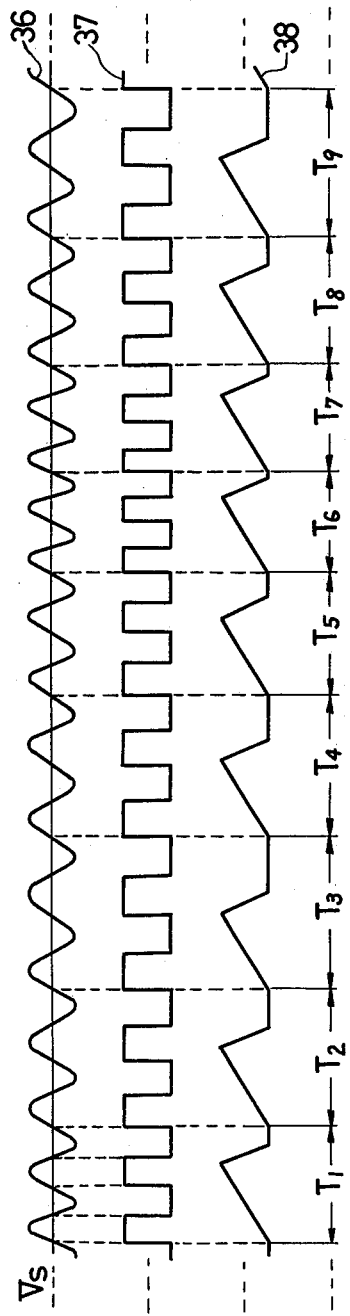

FIG. 7 shows the relation between the signal 25 from the light receiving unit 24 and the galvanometer drive signal 38. In the case of FIG. 7, the interval of the scanning lines is set to two times the pitch of the linear encoder, or 40 μm. In FIG. 7, reference numeral 36 designates a signal which is obtained by amplifying the signal 25 from the light receiving unit 24 by the amplifier 27. This signal 36 is sliced by a threshold voltage Vs and shaped in the comparator 28, as a result of which a signal 37 is provided.

At every other rise of the signal 37 thus shaped (or whenever the table 10 moves 40 μm), the voltage of the galvanometer drive signal 38 is increased at the rise gradient $(E_1-E_0)/ta$. When the voltage reaches a value $E_1$, it is decreased at the fall gradient $(E_1-E_0)/tb$ to the original value $E_0$. Thereafter, the voltage is maintained at the value $E_0$ until the shaped signal 37 rises next, or for the period tn. The data ta, tb, $E_1$ and $E_0$ have been preset.

However, the data Tn and tn are not constant when the table 10 is irregularly fed. When the movement speed of the table 10 is low, the period in which the voltage is at $E_0$, i.e., the period tn in which the galvanometer is stopped is longer. When the movement speed of the table 10 is high, the period tn is shorter. Accordingly, the repetitive time interval Tn is changed with the movement speed of the table 10, but it is related to the pitch of the linear encoder 22 in the sense of position. Thus, the galvanometer drive signal 38 is outputted so that the interval of the scanning lines is exactly 40 μm. As a result, the interval of the scanning lines and the speed of the main scan are maintained unchanged. Therefore, even if the table 10 is irregularly fed, a record image high in quality can at all times be obtained.

Another embodiment of the signal processing circuit 26 will be described with reference to FIGS. 8 and 9, in which those components which have been described with reference to FIGS. 5 and 7 are therefore similarly numbered. In this example, the signal 25 from the light receiving unit 24 is multiplied in a PLL (Phase Locked Loop) circuit, and the galvanometer drive signal is produced every time the signal 25 thus multiplied is outputted several times. The embodiment deals with the production of scanning lines at various intervals according to signals from the linear encoder having a standard pitch.

Figure 8:
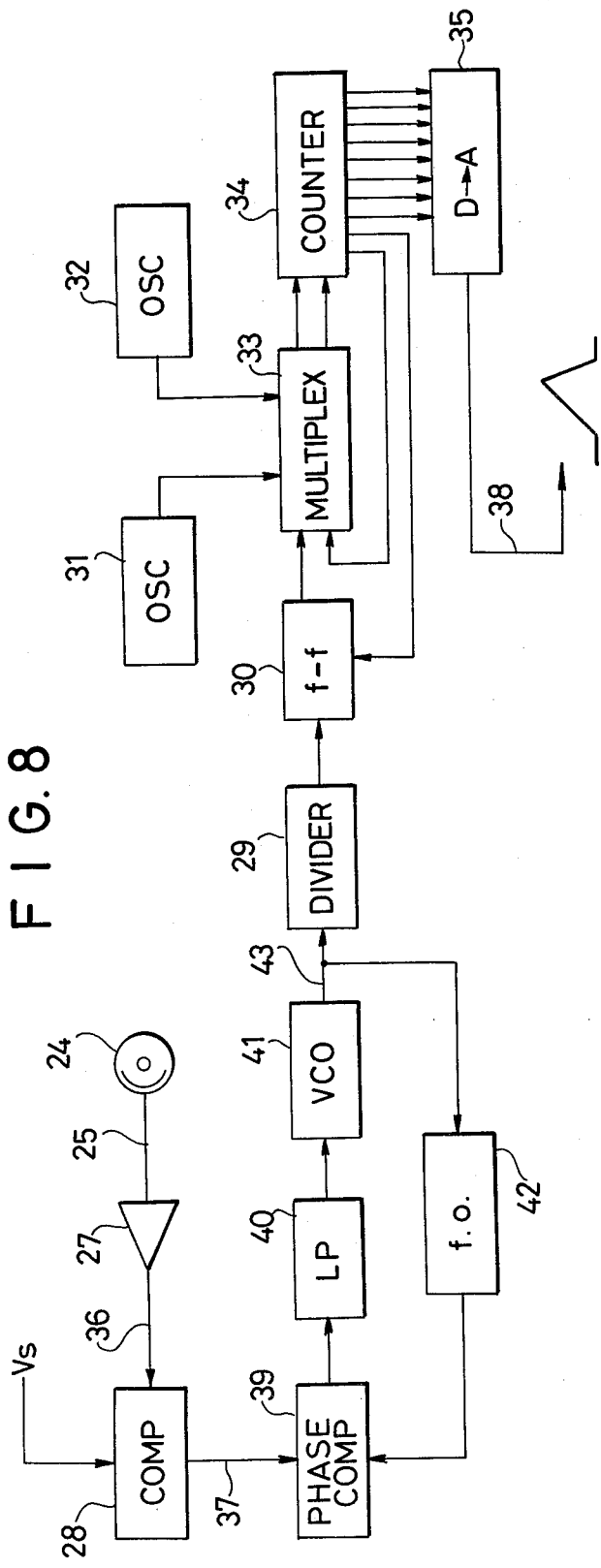

In FIG. 8, a phase comparator 39, a low-pass filter 40, a voltage-controlled oscillator 41, and a frequency divider 42 form the aforementioned PLL circuit. In this example, the frequency division ratio of the frequency divider is ½. Therefore, after being amplified by the amplifier 27, the signal 25 from the light receiving unit 24 is sliced in the comparator 28 and is then applied to the phase comparator 39. Thus, a signal 43 multiplied twice is outputted by the voltage-controlled oscillator 41. This signal 43 is applied to the frequency divider 29. Thereafter, as in the first example, the galvanometer drive signal 38 is obtained. In this example, the frequency division ratio of the frequency divider 29 is set to ½ so that the interval of the scanning lines is 30 μm.

Figure 9:
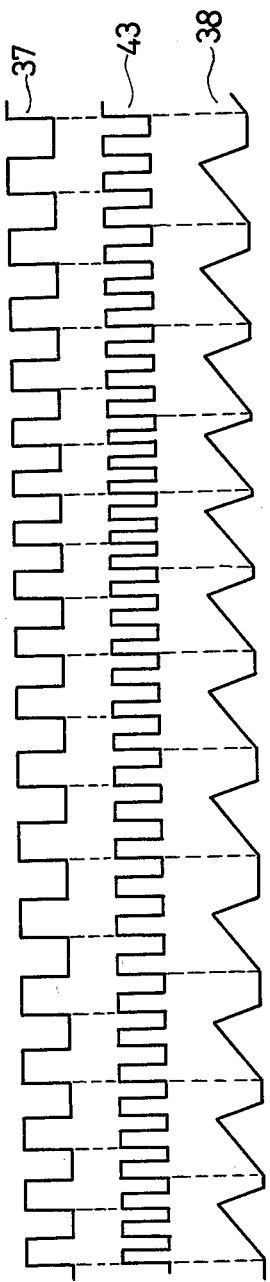

FIG. 9 show the relation between the shaped signal 37 from the comparator 28, the signal 43 multiplied twice from the voltage-controlled oscillator 41, and the galvanometer drive signal 38. In this example, even if the table 10 is irregularly fed, the scanning lines are produced at the interval of 30 μm at all times. Therefore, a shape image can be obtained. Furthermore, this example has an additional merit that, if the frequency division ratios of the frequency dividers 42 and 29 are suitably selected, the main scan can be achieved at various scanning intervals by the use of one linear encoder 22.

In general, a linear encoder (22) is disadvantageous in that the division accuracy is lowered for an extremely fine pitch. However, in this embodiment, the position signal obtained by using the linear encoder sufficiently high in accuracy is multiplied by an electrical process. Accordingly, the embodiment has another merit that the same effects as those in the case where a linear encoder high in accuracy and high in division is employed, can be obtained.

In the above-described embodiment, the light beam scanner is employed as recording means. However, the light beam scanner according to the invention may be used as the reading means. In this case, the reduction in resolution due to the irregular feeding of the auxiliary scanning system, and the disturbance to image information can be markedly reduced.

As is apparent from the above description, if the invention is applied to recording means, then even with the auxiliary scanning system having the irregular feeding operation the interval of the scanning lines is maintained constant. Thus, the reduction in quality of the record image due to the visual stripes which are caused by the irregular intervals of the scanning lines can be sufficiently eliminated. Furthermore, since it is unnecessary to provide an auxiliary scanning mechanism high in accuracy and an additional optical deflector for the light beam scanner of the invention, the light beam scanner is simple in construction, low manufacturing cost, and high in performance. If the light beam scanner is employed for reading means, then the reading means will have high accuracy.

What is claimed is:

1. A light beam scanner comprising:
   a light source;
   an optical deflector for repeatedly scanning a surface to be scanned in a series of scanning lines in a predetermined direction with a beam from said source, starting each scan at a desired time instant;
   means for moving said surface to be scanned in a linear direction substantially perpendicular to the direction of scanning lines formed on said surface;
   means movable with said surface and receiving a beam from said source for producing a signal whenever said surface to be scanned is moved a predetermined distance; and
   means for operating said optical deflector in synchronization with said signal.

2. The scanner of claim 1 wherein said means for moving said surface comprises a movable platform supporting said surface, a lead screw, a nut mounted on said movable platform and engaged with said lead screw and motor means for rotating said lead screw.

3. The scanner of claim 2 further comprising a pair of parallel guide rails supporting said movable platform.

4. The scanner of claim 1 wherein said means for producing a signal comprises encoder means movable with said surface, optical means focusing light onto said encoder, and a sensor responsive to light passing through said encoder and producing said signal.

5. The scanner of claim 4 wherein said encoder means comprises a linear encoder having alternate transparent and opaque bands.

6. The scanner of claim 4 wherein said optical means comprises a beam splitter diverting light from said light source and a focusing lens in the optical path of the diverted light.

7. The scanner of claims 1 or 4 wherein said means for operating said optical deflector comprises means to shape said signal into a pulse train, clock pulse generator means, multiplex means receiving said pulse train and the output of said clock pulse generator means, and output means responsive to said multiplex means to produce an optical deflector synchronism signal.

8. The scanner of claim 7 wherein said means to shape said signal comprises comparator means receiving said signal, and a frequency divider.

9. The scanner of claim 7 wherein said clock pulse generator means comprises a first oscillator generating a count-up clock signal and a second oscillator generating a count-down clock signal.

10. The scanner of claim 7 wherein said output means comprises a counter receiving the output of said multiplexer and a digital-to-analog converter converting the output signal of said counter to an analog optical deflector synchronism signal.

11. The scanner of claim 10 further comprising logic means receiving the output signal of said counter and selectively passing said pulse train to said multiplexer.

12. The scanner of claim 7 further comprising a flip-flop receiving an output signal from said output means and selectively passing said pulse train to said multiplexer.

13. The scanner of claim 8 wherein said means to shape said signal comprises a phase locked loop interposed between said comparator and said frequency divider.

* * * * *